E. G. KLEIN & J. X. GIERING.
Optometer.

No. 221,323.  Patented Nov. 4, 1879.

WITNESSES:
Henry N. Miller
C. Sedgwick

INVENTOR:
E. G. Klein
J. X. Giering
BY Munn & Co.
ATTORNEYS.

UNITED STATES PATENT OFFICE.

EMIL G. KLEIN AND JOSEPH X. GIERING, OF ROCHESTER, NEW YORK.

IMPROVEMENT IN OPTOMETERS.

Specification forming part of Letters Patent No. 221,323, dated November 4, 1879; application filed September 15, 1879.

*To all whom it may concern:*

Be it known that we, EMIL G. KLEIN and JOSEPH X. GIERING, of Rochester, in the county of Monroe and State of New York, have invented a new and useful Improvement in Optometers, of which the following is a specification.

In our improved optometer we make use of a tube fitted with an eye-piece and lens at one end, and containing an inner object-slide, which consists of a short tube fitted to slide and connected through a slot in the main tube with a clamping-screw or finger-piece, whereby the convexity and concavity are indicated by the position of the slide when brought to a focus to suit the eye.

The construction will be more particularly described with reference to the accompanying drawings, and the invention pointed out in the claims.

Figure 1:
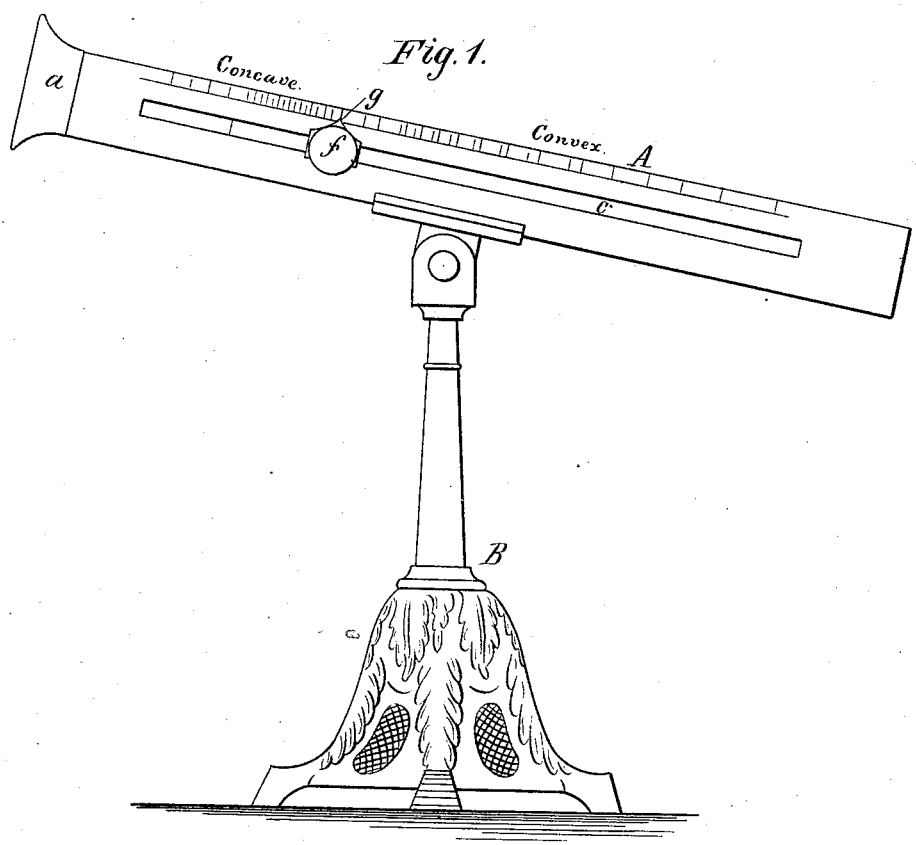
Figure 2:
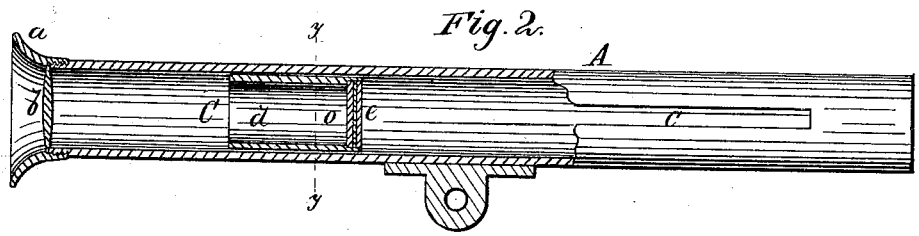
Figure 3:

In the drawings, Figure 1 is a side elevation of our improved optometer mounted upon a stand. Fig. 2 is a vertical longitudinal section of the same. Fig. 3 is a cross-section on line $y\ y$ of Fig. 2.

Similar letters of reference indicate corresponding parts.

A is the main tube, which we have shown as fitted to swing on a portable stand, B; but the tube may be made for use without a stand, if desired. On one end of tube A is fitted an eye-piece, $a$, with a lens, $b$, the focus of which lens should be at about midway in the length of the tube A—say, a lens of six-inch focus with a tube of twelve inches or more. In one side of tube A is a slot, $c$, extending nearly the full length of the tube, and upon the tube, at the side of slot $c$, a scale is engraved or affixed.

The object-piece C is fitted to slide within tube A, and consists of a short tube, $d$, fitted at one end with two circular disks, $e$, of transparent glass, between which is placed a disk of paper, or other translucent material, on which a number of dots or lines have been printed or otherwise affixed in opaque color.

At the side of tube $d$ is attached a screw-knob or finger-piece, $f$, that passes through the slot $c$ of the main tube A, so that the knob serves for moving the object-slide, and also for clamping it tightly at any point in the length of slot $c$. Upon the knob $f$ is a pointer, $g$, that lies against the main tube, so as to indicate, in connection with the scale, the position of the object-disk. The scale is arranged so that the pointer $g$ will indicate the natural or neutral point when the paper contained between the glasses $e$ is at the focus of the lens $b$.

In use the slide $c'$ is to be moved in tube A, in either direction, to the point where the dots or lines can be most distinctly seen by the observer, and then clamped by the knob $f$. By having a number of dots or lines, the correct position is more readily obtained as the ability to count the dots becomes a test, and the pointer will indicate by the scale either the convexity or concavity.

By using a tube greater accuracy is obtained, as the light is excluded at the sides, and the rigid tube is superior to the telescopic tubes heretofore used on account of its convenience and cheapness.

The portable stand renders the optometer more convenient for use, and holds the tube more steadily than it could be held by hand.

Having thus described our invention, we claim as new and desire to secure by Letters Patent—

1. The improved optometer consisting of the slotted tube A, fitted with the lens $b$, and containing the object-slide C, substantially as described and shown.

2. In optometers, the object-slide C, consisting of the tube $d$, fitted with the screw-knob $f$, glasses $e$, and disk of paper or other material, combined with the slotted tube A and its lens $b$, substantially as described and shown, and for the purposes set forth.

EMIL G. KLEIN.
JOSEPH X. GIERING.

Witnesses:
E. M. MOORE, Jr.,
R. E. WHITE.